United States Patent [19]

Abel et al.

[11] 4,426,309

[45] Jan. 17, 1984

[54] ANTIFREEZE CORROSION INHIBITOR COMPOSITION FOR ALUMINUM ENGINES

[75] Inventors: Michael L. Abel, Plainfield; Thomas P. Yates, Frankford, both of Ill.

[73] Assignee: Northern Petrochemical Company, Omaha, Nebr.

[21] Appl. No.: 473,944

[22] Filed: Mar. 10, 1983

Related U.S. Application Data

[62] Division of Ser. No. 280,877, Jul. 6, 1981, Pat. No. 4,382,870.

[51] Int. Cl.³ .......................... C09K 5/00; F28F 23/00
[52] U.S. Cl. ........................................ 252/75; 252/74; 252/77
[58] Field of Search .............................. 252/74, 75, 77

[56] References Cited

U.S. PATENT DOCUMENTS

| | | | |
|---|---|---|---|
| 2,524,484 | 10/1950 | Smith | 252/75 |
| 2,693,451 | 11/1954 | Heisig | 252/75 |
| 2,803,604 | 8/1957 | Meighen | 252/75 |
| 2,815,328 | 12/1957 | Green et al. | 252/75 |
| 2,972,581 | 2/1961 | Johnson et al. | 252/75 |
| 3,414,519 | 12/1968 | Beynon | 252/75 |
| 3,445,395 | 5/1969 | Boehmer | 252/75 |
| 3,553,137 | 1/1971 | Woods | 252/75 |
| 3,769,220 | 10/1973 | Willard et al. | 252/75 |
| 4,149,985 | 4/1979 | Wilson | 252/75 |
| 4,160,740 | 7/1979 | Sweet | 252/75 |

OTHER PUBLICATIONS

Wiggle, Hospadaruk and Styloglou, "The Effectiveness of Engine Coolant Inhibitors for Aluminum", NACE, 1980.
Wiggle and Hospadaruk, "A Rapid Method to Predict the Effectiveness of Inhibited Engine Coolants in Aluminum Heat Exchangers", SAE, 1980.

*Primary Examiner*—John E. Kittle
*Assistant Examiner*—Robert A. Wax
*Attorney, Agent, or Firm*—Donald F. Haas

[57] ABSTRACT

An antifreeze composition for use in aluminum internal combustion engines is disclosed. It is comprised of 0.07 percent to 0.35 percent nitrate, 0.04 percent to 0.08 percent silicate, 0.05 percent to 0.25 percent tolyltriazole, benzotriazole or a mixture thereof, 0.2 percent to 1.5 percent borate, and 0.2 percent to 0.75 percent phosphate.

1 Claim, No Drawings

ANTIFREEZE CORROSION INHIBITOR COMPOSITION FOR ALUMINUM ENGINES

This is a division, of application Ser. No. 280,877, filed July 6, 1981 now U.S. Pat. No. 4,382,870.

BACKGROUND OF THE INVENTION

The present invention is a composition for use in the cooling systems of internal combustion engines. More particularly, the composition is an ethylene glycol-based antifreeze composition which is designed to protect aluminum water pumps, aluminum engine heads, and aluminum radiators from corrosion.

Generally, water is the accepted heat exchange medium for the cooling systems of internal combustion engines. Ethylene glycol is widely used to lower the freezing point of water and to raise its boiling point to enable the coolant to be used over a wider range of temperatures. Ethylene glycol and other such antifreezes tend to corrode the metals from which the internal combustion engines are made under the conditions of elevated temperature and aeration. Therefore, it has been necessary to add corrosion inhibitor compositions to the antifreeze solutions to lessen the corrosive effect of the solutions.

In recent years, automobile manufacturers have been using more and more aluminum as a lightweight material in the construction of internal combustion engines. Since aluminum reacts differently than other metals when exposed to the corrosive action of ethylene glycol antifreeze solutions, it has become necessary to develop corrosion inhibitor compositions which prevent or lessen corrosion of aluminum as well as of the other metals which are used in the construction of internal combustion engines. Prior to the development of the present invention, the antifreeze industry has been relatively unsuccessful in developing a practical effective corrosion inhibitor composition which prevents corrosion of aluminum as well as other metals.

The primary object of this invention, therefore, is to provide a novel combination of corrosion inhibitors suitable for use in the cooling system of an internal combustion engine in which a large amount of aluminum is exposed to the corrosive action of ethylene glycol antifreeze compositions.

SUMMARY OF THE INVENTION

The present invention is an antifreeze composition for use in aluminum internal combustion engines. The composition is comprised of from about 0.07 percent to about 0.35 percent nitrate as $NO_3$, from about 0.04 percent to about 0.08 percent silicate as $SiO_2$, from about 0.05 percent to about 0.25 percent tolyltriazole, benzotriazole, or a mixture thereof, from about 0.2 percent to about 1.5 percent borate as sodium tetraborate pentahydrate, from about 0.2 percent to about 0.75 percent phosphate as $PO_4$, and the balance polyhydroxy alcohol. The pH of this composition can range from 9 to 11.5. The cations should either be sodium or potassium or a mixture thereof. The silicate preparation can be a liquid or a powder with a caustic to silica ratio of from about 1:1 to about 1:4.

DETAILED DESCRIPTION OF THE INVENTION

The present invention is an ethylene glycol-based antifreeze composition which is intended to be blended with water and used as the heat exchange medium in the cooling systems of internal combustion engines which contain a large amount of aluminum exposed to the corrosive activity of the antifreeze composition. The basic ingredient of the composition is a polyhydroxy alcohol such as ethylene glycol, propylene glycol, or diethylene glycol, but preferably ethylene glycol. The composition must contain the five ingredients discussed below in the indicated concentration ranges in order to provide good corrosion protection for aluminum and other metals. In all cases, if less than the lower limit of the indicated range is used, the performance in terms of corrosion protection of the composition is unacceptable. If the upper ranges are exceeded, the benefits obtained are disproportionate to the cost of using more of the particular component.

The composition must contain from about 0.2 percent to about 0.75 percent of phosphate. The phosphate can be present in any of its various forms. The phosphate ion is very important in the protection of aluminum water pumps from cavitation corrosion, as well as providing corrosion protection to ferrous metal components. If the concentration of the phosphate is too high, it can become corrosive to aluminum engine heads. As discussed below, the silicate and nitrate are used to offset this tendency.

The composition must contain from about 0.04 percent to about 0.08 percent of silicate. Again, the silicate may be present in any of its various forms. The purpose of the silicate is to offset the corrosive tendencies of the phosphate ion. If the silicate concentration is too high, it will interfere with the function of the phosphate ion. Additionally, silicate provides corrosion protection to aluminum heat rejecting surfaces, including engine heads and radiators. The silicate preparation can be used in liquid or powder form and may have a caustic to silica ratio of from about 1:1 to about 1:4 because all commercially available silicate preparations falls within this range.

The composition must contain from 0.2 percent to about 1.5 percent of borate. Again, the borate may be present in any of its various forms. Borate is a good pH buffer. It is used to offset the tendency of the pH of the composition to decrease when acidic exhaust gases from the engine get into the composition. Borate is corrosive to cast aluminum heat rejecting surfaces such as engine heads. The corrosive effect of borate is offset by the addition of both silicate and nitrate.

The composition must also contain from 0.07 percent to about 0.35 percent nitrate. As with all of the other components, either sodium or potassium can be used as the cation. The nitrate ion provides protection to aluminum from pitting the crevice corrosion.

Finally, the composition must contain from about 0.05 percent to about 0.25 percent of tolyltriazole, benzotriazole or a mixture thereof. These triazoles protect copper and copper alloys from corrosion by forming an impervious film with copper on the metal.

The pH of the antifreeze composition must be maintained between 9 and 11.5. This is because the solubility of the alkali metal silicate is aided by the elevated pH. Further, it is desirable for the engine coolant to remain in this pH range because of the passivity of ferrous metals in this range.

There are four major components in internal combustion engines which must be protected from corrosion. They are the water pump, the engine head, the engine block, and the radiator. In aluminum internal combustion engines, the water pump, the engine head, and the radiator are made of aluminum. Also, there are other metals in the cooling system which must be protected. The composition of the present invention performs excellently in preventing corrosion of cast aluminum, copper, solder, brass, steel and cast iron. These are all metals present in the type of internal combustion engines which this composition is designed to protect.

It is desirable to include an effective amount of an antifoaming composition in the antifreeze composition. Such components are well-known and preferably may be a polyglycol-type antifoaming agent.

The following examples are meant only to illustrate the invention and not to limit it in any way. The following composition was used in all of the examples set out below:

| Ingredient | Percent By Weight |
| --- | --- |
| Mono and other ethylene glycols | 95.77% |
| Demineralized water | 1.12% |
| Dipotassium phosphate (50% solution) | 1.99% |
| Sodium tetraborate pentahydrate | 0.26% |
| Sodium nitrate | 0.26% |
| Sodium tolyltriazole (50% solution) | 0.25% |
| An aqueous potassium silicate solution containing 26% $SiO_2$ | 0.20% |
| Potassium hydroxide, anhydrous | 0.11% |
| Antifoam | 0.04% |
| | 100.00% |

All of the above weight percentages are based upon the actual weight of the entire composition including the cation whereas the weight percentages used in the claims are only based upon the weight of the active corrosion inhibition anions, except borate which is based on sodium tetraborate pentahydrate and silicate which is based on $SiO_2$. The pH of the composition was 10.5

EXAMPLE I

The above composition was tested according to ASTM method D-2809. This is a method for simulating the protection of aluminum water pumps from cavitation corrosion. The above composition rated 9 on a scale where the maximum was 10. Federal government specification A-A870 states that 8 is an acceptable rating for antifreeze compositions.

EXAMPLE II

The ability of the above composition to protect aluminum headed engines was evaluated in a cast aluminum heat transfer surface corrosion test. This method is used as an inhibitor package screening tool for coolants to be used in aluminum containing cooling systems. An aluminum sample is weighed and placed in a flask in close proximity to a heat source. A water cooled condenser is attached to the flask. A sample of the coolant to be tested is prepared by mixing the coolant with ASTM D-1384 corrosive water such that the concentration of the coolant is 15 percent and then poured into the flask. The heat source is adjusted so that the coolant boils vigorously. Then the cooling water to the condenser is turned on. It is necessary to have sufficient flow so that all of the coolant which is evaporated is refluxed back into the flask. The test is continued for 168 hours. The aluminum sample is cleaned by removing adherent deposits by scraping it with a soft bristle brush and then dipping it for 5 minutes in a water solution containing 2 percent of chromiumtrioxide and 5 percent of orthophosphoric acid maintained at 175° F. (79° C.). The sample is then rinsed with water to remove the acid, brushed lightly with the brush to remove any loose film, rinsed in water, rinsed in methanol, dried, and weighed. The corrosion rate for the above formula was 0.1 milligrams lost per square centimeter per week whereas General Motors' standard antifreeze formulation (comprised of 0.15% nitrate, 0.045% silicate, 0.084% tolyltriazole, 0.98% borate, and 0.10% phosphate) exhibited a corrosion rate of 39.

EXAMPLE III

The ability of the above composition to protect aluminum radiators for corrosion was evaluated by using a simulated service circulation test. The test measures pitting corrosion on the header plates and crevice corrosion in the area between the plastic tanks and the aluminum header plates. The composition tested comprised 45 percent of the above composition and 55 percent water by volume. Sodium chloride, sulphate and bicarbonate were added to give a final concentration of 100 parts per million. 35 grams of core sand was added to the test solution. The composition was placed in a radiator wherein the flow rate was 7 feet per second through the radiator tubes. The test was run for a period of time representing 50,000 simulated miles at a temperature of 225° F. (107° C.) measured at the inlet side of the radiator. The radiator is incorporated along with a 2 liter Pinto ® engine plus a heater core and a water pump. The composition rated 10 (maximum is 10) in preventing both pitting corrosion and crevice corrosion. A rating of 10 for pitting corrosion represents no pitting of the header plate on the aluminum radiator. The rating of 10 for crevice corrosion represents no corrosion along the crevice made betwen the plastic coolant tank and the header plate of the aluminum radiator. Ford Motor Company's specifications state that the antifreeze must rate at least 6.

EXAMPLE IV

The above composition was evaluated according to ASTM test method D-2847. This method shows how the coolant protects all metals in actual vehicle operation. It was a fleet test which lasted seven months with an average vehicle mileage of 10,400. The following table shows how the composition of the present invention protected six metals and compares the performance for the above composition to the standards for two other ASTM corrosion protection test methods (there is no standard specified for ASTM test method D-2847). The numbers given are corrosion rates for an average of 20 coupons and in the cases of the two ASTM standards, the numbers given are considered to be acceptable losses.

| Metals | Corrosion Rate (Milligrams Lost Per Coupon) | | |
| --- | --- | --- | --- |
| | Invention Composition | ASTM D-1384 | ASTM D-2570 |
| Copper | −5.2 | −10 | −20 |
| Solder | −13.3 | −20 | −60 |
| Brass | −3.1 | −10 | −20 |
| Steel | −3.0 | −10 | −20 |
| Cast iron | −3.6 | −10 | −20 |
| Cast aluminum | +0.4 | −20 | −60 |

It can be seen from the above table that the composition of the present invention produces results which are far better than the acceptable standards of the two ASTM corrosion test methods. The reason that the cast aluminum coupon increased in weight is that the composition of the present invention forms oxides with the aluminum which are actually heavier than the metal itself.

We claim:

1. A method for providing corrosion inhibition in aluminum-containing internal combustion engines which utilize a polyhydroxyalcohol-based coolant, comprising adding to said coolant:
   (a) from about 0.07% to about 0.35% nitrate,
   (b) from about 0.04% to about 0.08% silicate,
   (c) from about 0.05% to about 0.25% of a compound selected from a group consisting of tolyltriazole, benzotriazole, and mixtures thereof,
   (d) from about 0.2% to about 1.5% borate, and
   (e) from about 0.2% to about 0.75% phosphate,
wherein the cations are selected from the group consisting of sodium, potassium, and mixtures thereof and wherein the pH of the composition is from about 9 to about 11.5.

* * * * *